(12) United States Patent
Maguire et al.

(10) Patent No.: US 9,088,643 B2
(45) Date of Patent: Jul. 21, 2015

(54) METHOD AND SYSTEM FOR SUBSCRIBING MIGRATION TO ALTERNATIVE ACCESS NETWORKS

(71) Applicant: Verizon Patent and Licensing Inc., Basking Ridge, NJ (US)

(72) Inventors: Thomas Maguire, Basking Ridge, NJ (US); Thomas K. MacNabb, Bernardsville, NJ (US); Edward A. Cleaver, Oakland, NJ (US); Srinivasa M. Kalapala, Ashburn, VA (US); Porusp N. Marshall, Falls Church, VA (US); Himanshu Polavarapu, Grapevine, TX (US); Velamur Srinivasan Sudharsan, Flowermound, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/081,852

(22) Filed: Nov. 15, 2013

(65) Prior Publication Data

US 2015/0139407 A1    May 21, 2015

Related U.S. Application Data

(60) Provisional application No. 61/818,403, filed on May 1, 2013.

(51) Int. Cl.
*H04M 1/24* (2006.01)
*H04M 3/08* (2006.01)
*H04M 3/22* (2006.01)

(52) U.S. Cl.
CPC .................................. *H04M 3/22* (2013.01)

(58) Field of Classification Search
CPC .............. H04W 4/22; H04L 43/0811; H04M 2207/206; H04M 3/42297; H04Q 11/04
USPC ........ 379/1.01, 9, 9.03, 9.04, 9.05, 10.01, 12, 379/15.01, 15.03, 15.05, 22, 22.03, 26.01, 379/27.01, 29.01, 29.05, 29.09, 32.01, 379/32.04
See application file for complete search history.

(56) References Cited

U.S. PATENT DOCUMENTS

| | | | | |
|---|---|---|---|---|
| 5,862,201 | A * | 1/1999 | Sands | 379/27.06 |
| 5,889,837 | A * | 3/1999 | Sands | 379/27.06 |
| 6,104,909 | A * | 8/2000 | Baldwin et al. | 455/425 |
| 6,657,994 | B1 * | 12/2003 | Rajakarunanayake | 370/352 |
| 6,898,413 | B2 * | 5/2005 | Yip et al. | 455/3.03 |
| 7,983,148 | B1 * | 7/2011 | Abramson et al. | 370/217 |
| 7,983,670 | B1 * | 7/2011 | Elliott | 455/426.2 |
| 8,654,631 | B2 * | 2/2014 | Hicks, III | 370/225 |
| 2005/0003797 | A1 * | 1/2005 | Baldwin | 455/404.1 |
| 2007/0054660 | A1 * | 3/2007 | Cardina et al. | 455/417 |
| 2008/0305792 | A1 * | 12/2008 | Khetawat et al. | 455/435.1 |
| 2011/0038364 | A1 * | 2/2011 | Monsieux et al. | 370/352 |
| 2011/0072312 | A1 * | 3/2011 | Fan et al. | 714/46 |
| 2011/0090788 | A1 * | 4/2011 | Hicks, III | 370/228 |
| 2013/0143516 | A1 * | 6/2013 | Winterbottom et al. | 455/404.2 |

* cited by examiner

*Primary Examiner* — Harry S Hong

(57) ABSTRACT

An approach for subscriber migration to alternative access networks is described. A subscriber migration platform determines a fault in a wireline voice network associated with a subscriber premise, determines that the subscriber premise is associated with a chronic account based on the fault, and migrates the subscriber premise from the wireline voice network to a wireless voice network.

21 Claims, 14 Drawing Sheets

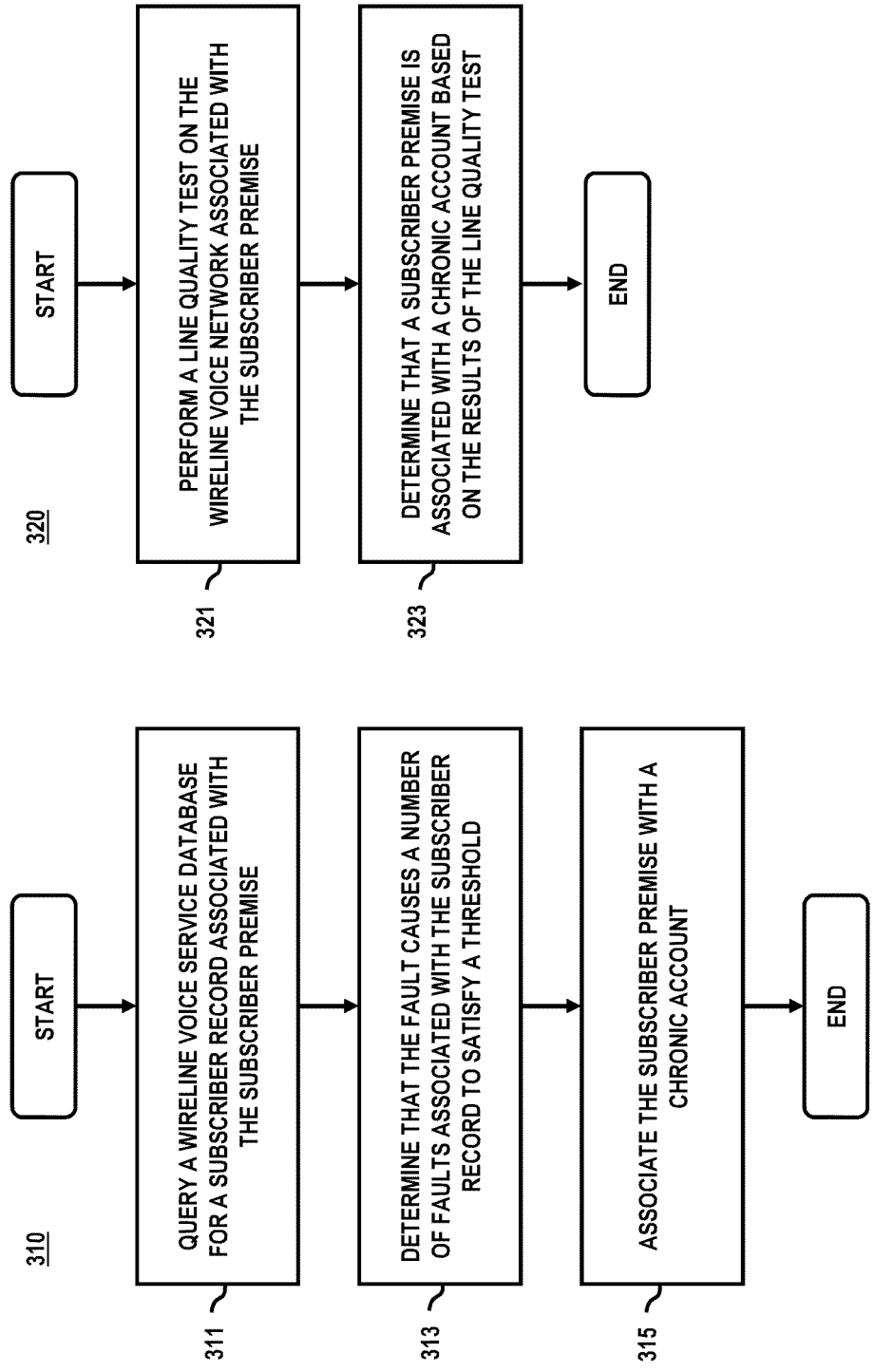

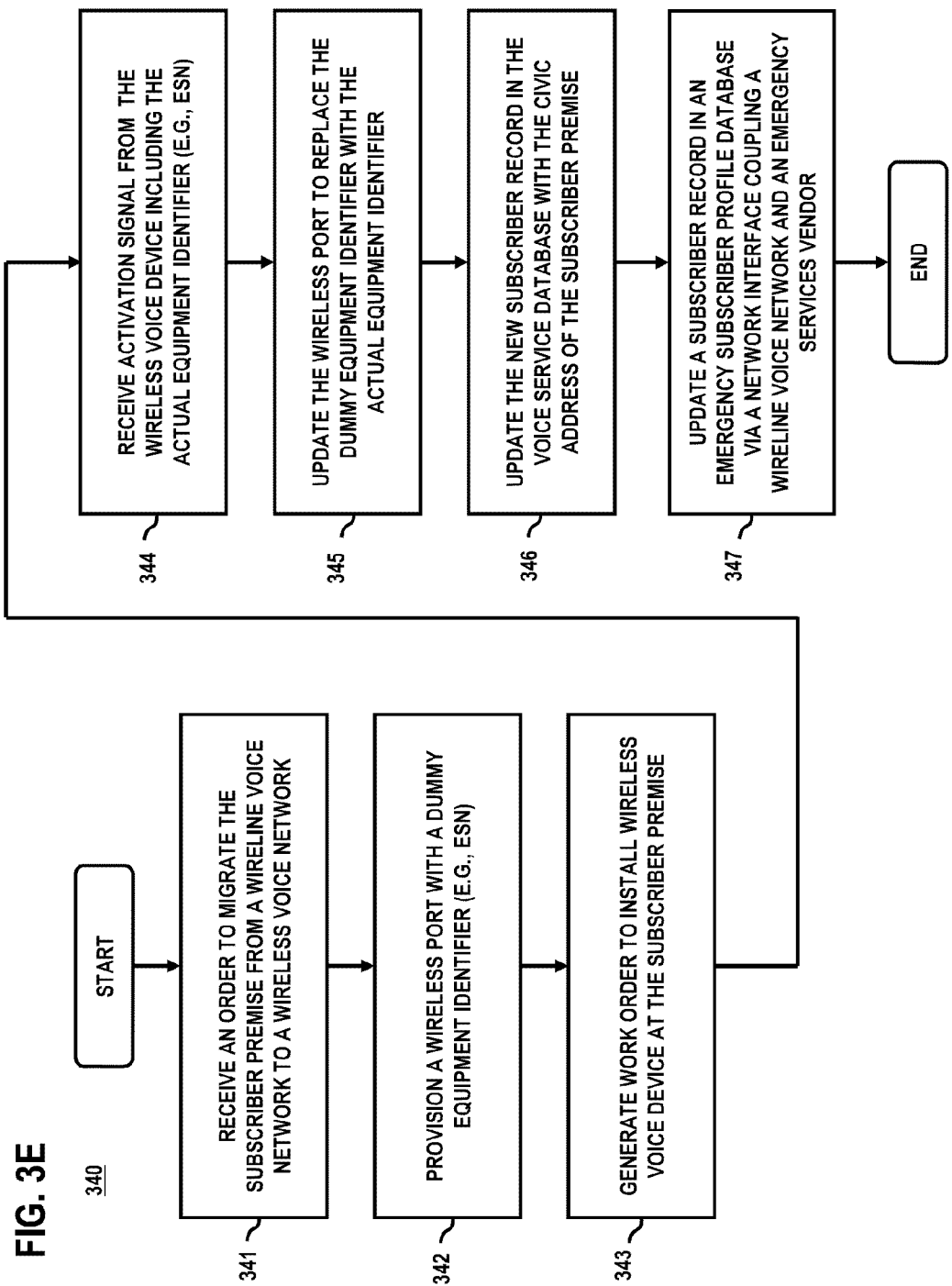

METHOD AND SYSTEM FOR SUBSCRIBING MIGRATION TO ALTERNATIVE ACCESS NETWORKS

RELATED APPLICATIONS

This application claims the benefit of the earlier filing date under 35 U.S.C. §119(e) of U.S. Provisional Application Ser. No. 61/818,403 filed May 1, 2013, entitled "Method and System for Subscriber Migration to Alternative Access Networks," the entirety of which is incorporated herein by reference.

BACKGROUND INFORMATION

Existing copper telecommunication networks (e.g., traditional plain old telephone service (POTS) or telephony networks) suffer from deterioration by exposure to the environment over an extended period of time. Both underground and exposed access networks may become worn by exposure to wind and rain as well as by damage caused by animals or persons. The deterioration in the copper infrastructure results in a degraded quality of service. For example, for telephony networks, the voice service may become entirely unavailable during rainfall or the presence of excessive moisture. At other times, the voice quality may suffer from excessive background noise, static, or attenuation (e.g., low volume). Providers of such traditional copper telecommunications networks face mounting costs to maintain the copper infrastructure over time.

Therefore, there is a need for an efficient and seamless method to identify poor quality of service associated with existing copper telecommunication networks and transition subscribers from their existing copper-based service to alternative access networks.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3H are flowcharts depicting processes for subscriber migration, according to one embodiment;

DESCRIPTION OF THE PREFERRED EMBODIMENT

An apparatus, method, and software for subscriber migration to alternative access networks are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

As used herein, the term "copper-based voice service" or "wireline voice service" refers to POTS service offered by a local exchange carrier (LEC). As used herein, the term "copper-based voice network" or "wireline voice network" may refer to a public switched telephone network (PSTN), an integrated services digital network (ISDN), a private branch exchange (PBX), or other like network. As used herein, the term "wireless voice service" refers to voice service delivered over wireless/cellular networks (e.g., code division multiple access (CDMA), global system for mobile communications (GSM), or long term evolution (LTE) networks, etc.). As used herein, the term "alternative access networks" may refer to an optical fiber network (e.g., fiber to the home (FTTH), fiber to the building (FTTB), fiber to the curb (FTTC), etc.) or a wireless network. As used herein, the term "subscriber" may include any person or entity obtaining or utilizing voice services from a service provider. As used herein, the term "migration," "migration path," or "subscriber migration" may refer to provisioning a new voice service utilizing an alternative access network, transitioning a subscriber's account information to the new service, and decommissioning the subscriber's old POTS service.

As used herein, the term "service provider" is used to refer to a provider of voice services, including traditional copper-based wireline voice service (e.g., POTS) as well as alternative voice services (e.g., Voice over Internet Protocol (VoIP)) based on optical fiber and wireless access technologies. It is contemplated that the access networks of the service provider may be maintained by a single entity or by sub-divisions thereof. In one embodiment, the copper-based wireline infrastructure may be maintained by a LEC sub-division and the alternative access networks may be maintained by one or more other sub-divisions. The various embodiments described herein are independent of the particular organizational model of the service provider.

Figure 1A:
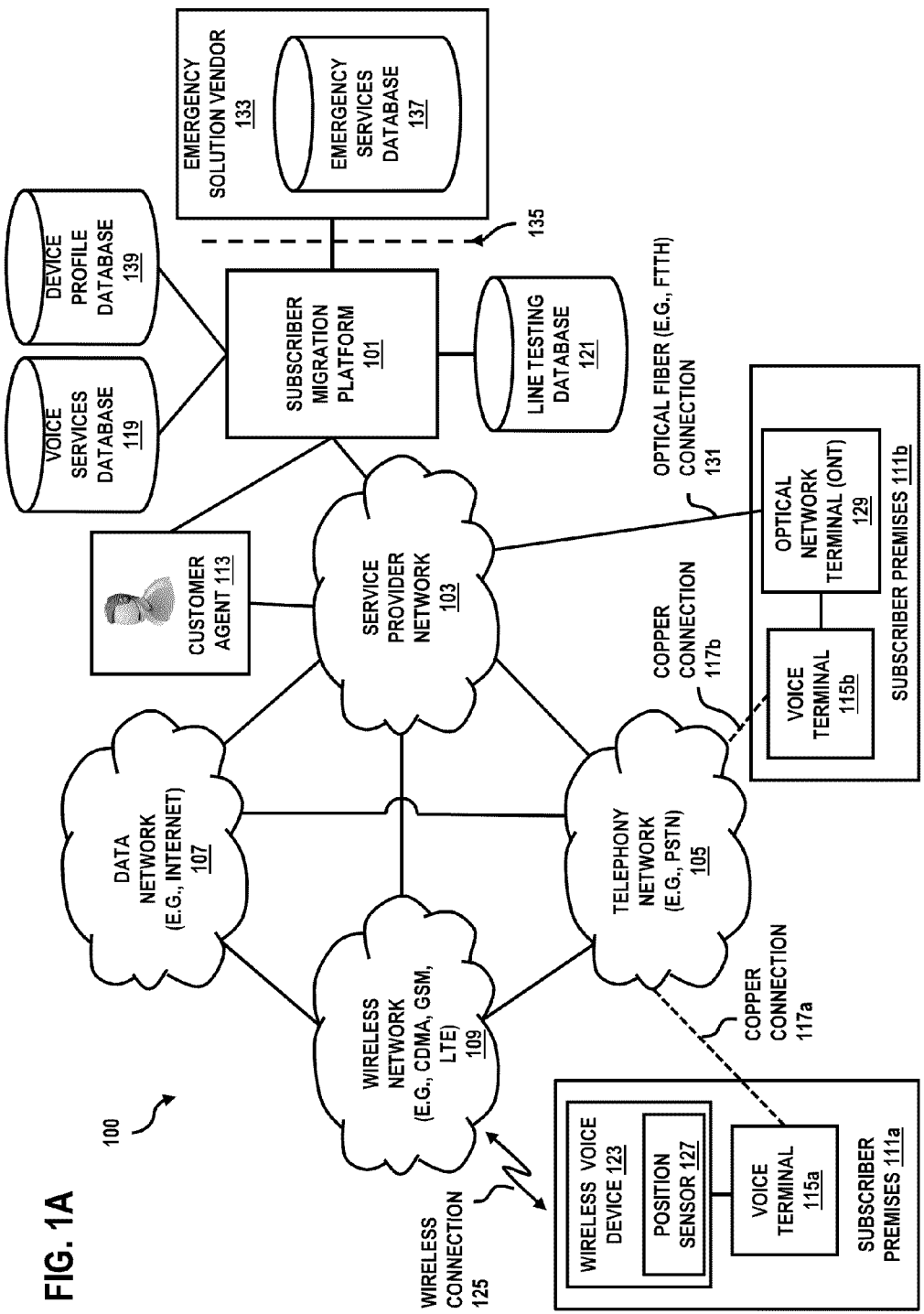
FIG. 1A is a diagram of a system capable of performing subscriber migration, according to one embodiment.

FIG. 1A is a diagram of a system 100 capable of performing subscriber migration services, according to one embodiment. For the purpose of illustration, the system 100 employs a subscriber migration platform 101 that is configured to provide subscriber migration services. The subscriber migration platform 101 may be connected to or be a part of a service provider network 103. However, in alternative embodiments, the subscriber migration platform 101 could be implemented as any part of the system 100. For example, the network infrastructure for a wireless voice network may be maintained by a different sub-division (not shown for illustrative convenience) than the one maintaining the wireline voice network (not shown for illustrative convenience). Thus, the subscriber migration platform 101 may be capable of coordinating the execution of various provisioning (and decommissioning) tasks at sub-ordinate systems across organizational boundaries. For example, the subscriber migration platform 101 may be a part of the wireless voice network's control infrastructure and may interact with the wireline voice network's control infrastructure via an intermediary system (not shown for illustrative convenience). It is contemplated that there may be various alternative arrangements for the placement of the subscriber migration platform 101, but the embodiments described herein are independent of any particular arrangement.

The service provider network 103 can interact with one or more other networks, such as a telephony network 105, a data network 107, and/or a wireless network 109. For illustrative purposes, the networks 103-109 may be any suitable wireline and/or wireless network, and be managed by one or more service providers. For example, telephony network 105 may include a circuit-switched network, such as the PSTN, an ISDN network, a PBX network, or other like network. Wireless network 109 may employ various technologies including, for example, CDMA, enhanced data rates for global evolution (EDGE), general packet radio service (GPRS), mobile ad hoc network (MANET), GSM, Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, the data network 107 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 103-109 may be completely or partially contained within one another, or may embody one or more of the aforementioned infrastructures. For instance, the service provider network 103 may embody circuit-switched and/or packet-switched networks that include facilities to provide for transport of circuit-switched and/or packet-based communications. It is further contemplated that networks 103-109 may include components and facilities to provide for signaling and/or bearer communications between the various components or facilities of the system 100. In this manner, networks 103-109 may embody or include portions of a signaling system 7 (SS7) network, or other suitable infrastructure to support control and signaling functions.

The telephony network 105 may in large part comprise a copper-based infrastructure. In particular, the telephony network 105 may extend from a central office (CO) (not shown for illustrative convenience) to the subscriber premises 111a and 111b (collectively referred to as subscriber premises 111). While the condition of the telephone wiring at the subscriber premises 111 may be in good condition, parts of the telephony network 105 may have degraded significantly as a result of extended exposure to the elements. As a result, these parts may require frequent maintenance to repair voice quality issues reported by subscribers. The degradation may be particularly significant for voice service areas distant from the CO. The subscribers in such areas (hereinafter also referred to as "copper-only subscribers") may have few cost-effective alternatives to their copper-based wireline voice service and the service provider may find the cost of replacing the copper infrastructure prohibitive. In one embodiment, the subscriber migration platform 101 identifies chronically affected subscribers and provides a migration path to an alternative access network, thus improving the quality of voice service as well as reducing costs associated with maintaining the copper infrastructure of the telephony network 105.

As shown in FIG. 1A, the subscriber premises 111 may include a voice terminal 115a and 115b (collectively referred to as voice terminals 115). In one embodiment, the voice terminals 115 may include various telephone handsets, including wireless and wired sets. It is contemplated that the voice terminals 115 may also include more sophisticated time-sharing telephony equipment (e.g., PBXs) or other equipment operating within the voice bandwidth (hereinafter referred to as "voice band devices"). The copper-based voice service may be provided to the subscriber premises 111 via copper wire connections 117a and 117b (collectively referred to as copper connections 117). As mentioned, the physical copper of these connections may have degraded over time and resulted in poor quality of service (e.g., poor voice quality) at the voice terminals 115. For example, during heavy rainfall the service may be interrupted because the copper connections 117 fail to reliably transmit voice band signals. Thus, the voice terminals 115 may simply be unable to provide a dial tone in severely affected situations.

The subscriber migration platform 101 may be configured to initiate a subscriber migration based on various triggers. In one embodiment, a wireline voice subscriber ("subscriber") may contact the service provider to report a problem with the wireline voice service. By way of example, the subscriber may contact the service provider's customer support center and interact with a live customer support representative or an interactive software-based response system (both collectively referred to as "customer agent 113"). Alternatively, the subscriber may contact the customer agent 113 by various other contact mediums, including web-based electronic interface (e.g., chat, email) as well as any other voice network (e.g., telephone call). The information collected by the customer agent 113 may trigger or otherwise cause the subscriber migration platform 101 to determine a migration path.

Alternatively, the subscriber migration platform 101 may independently identify subscribers that it determines would benefit from migration to an alternative access network. For example, the subscriber migration platform 101 may identify subscribers that have a history of frequently requesting maintenance or reporting voice quality issues. As shown, the subscriber migration platform 101 may include, or be connected to, a voice services database 119 that maintains subscriber records for all the service provider's voice services (e.g., POTS, VoIP, etc.). The voice services database 119 may also include an activity record (not shown for illustrative convenience) associated with a particular subscriber account, including reports of outages or degraded voice quality. In one embodiment, the subscriber migration platform 101 may query the voice services database 119 for such records. For example, the subscriber migration platform 101 may query the voice services database 119 to obtain a history of reported issues (e.g., interference, cross-talk, echo, noise, attenuation, etc.) for a particular subscriber premise. In one embodiment, the subscriber migration platform 101 may utilize data mining techniques to analyze historical trends and identify service areas or regions with a high incidence of symptoms associated with a degraded copper infrastructure. As shown, the subscriber migration platform 101 may also include, or be connected to, a line testing database 121. In one embodiment, the line testing database 121 may hold testing data collected by the service provider during periodic and/or scheduled testing of voice quality on selected lines. The subscriber migration platform 101 may access the line testing database 121 to identify subscribers that may benefit from migration to an alternative access network.

In addition to identifying subscribers based on their history, the subscriber migration platform 101 may also identify subscribers based on their location. For example, and as previously mentioned, certain subscribers (e.g., copper-only subscribers) may be suitable candidates for migration because they are located in remote areas. In one embodiment, the subscriber migration platform 101 may identify subscribers located in an area affected by a natural disaster (e.g., hurricane) as potential candidates for migration to an alternative access network.

After identifying potential candidates for migration, the subscriber migration platform 101 may mark or "tag" their subscriber records. In one embodiment, subscriber records indicating frequent quality issues may be tagged to indicate that the voice service is chronically impaired (hereinafter also referred to as "chronic account"). For example, an account may be tagged if the number of complaints satisfies a threshold or is reported with a certain frequency. A tagged account may be used to alert the customer agent (e.g., customer agent 113) that the subscriber is a potential candidate for migration. Therefore, the customer agent may then present the subscriber with the option of migrating to an alternative access network.

The customer agent 113 may provide one or more alternatives to a subscriber experiencing voice quality issues. In one embodiment, the customer agent 113 may offer subscribers a migration path to convert the existing POTS service to a wireless-based voice service. If the subscriber agrees to the terms of the offered service, the subscriber migration platform 101 may be caused to generate a work order to provision the new service and schedule the installation or delivery of equipment for the wireless service, such as the wireless voice device 123 discussed below. In one embodiment, the subscriber migration platform 101 may also generate an automated email at the time of order confirmation detailing the billed amounts for the current POTS service and an estimate of the new wireless voice service. In addition, the subscriber migration platform 101 may initiate various processes to provision the network infrastructure for the migration and transfer any account information from the existing copper-based wireline voice service to a wireless voice service.

In one embodiment, migrating from a wireline voice network to a wireless voice network may require the installation of a wireless voice device 123 at the subscriber premises 111a. In one embodiment, the subscriber migration platform 101 may decommission the existing copper-based voice service and place a work order to install the wireless voice device 123. After installation, the wireless voice device 123 may backlight the subscriber premise 111 and the voice terminal 115a connects to the wireless voice device 123 instead of the degraded copper connection 117. Thus, after migration, the subscriber may receive voice service via the wireless network 109 instead of the telephony network 105. In one embodiment, the transition from the POTS service to the wireless service may merely involve delivery of a wireless device 123 to the subscriber premise 111 rather than an installation that requires, for example, a work order and/or technician visit to the subscriber premise 111.

The wireless device 123 may be a device that bridges wireline POTS, such as at the subscriber premise 111, and the wireless network 109. In one embodiment, the wireless device 123 converts POTS signaling received from the voice terminal 115a to CDMA radio signaling for communication over the wireless network 109 via a wireless connection 125. By way of example, the wireless device 123 may convert the circuit-based voice band signals received from the voice terminal 115a to packet-based voice such that the voice content can be transported over the wireless connection 125. The conversion may be implemented by hardware and/or software and may include performing any necessary digital compression or encoding in order to achieve a desired level of service.

Figure 1C:
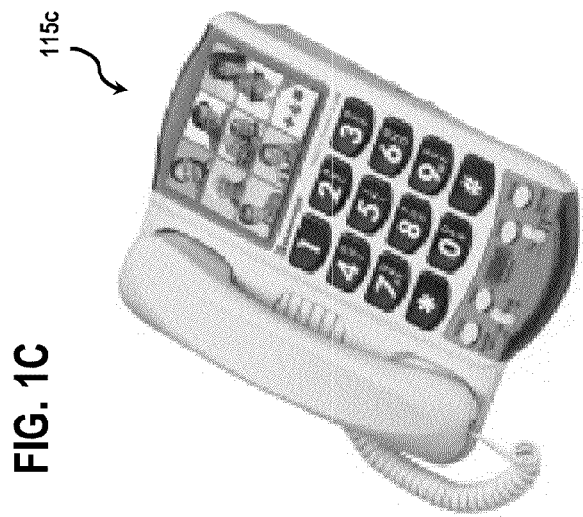
FIGS. 1B and 1C are diagrams of wireless voice devices, according to various exemplary embodiments.
Figure 1B:
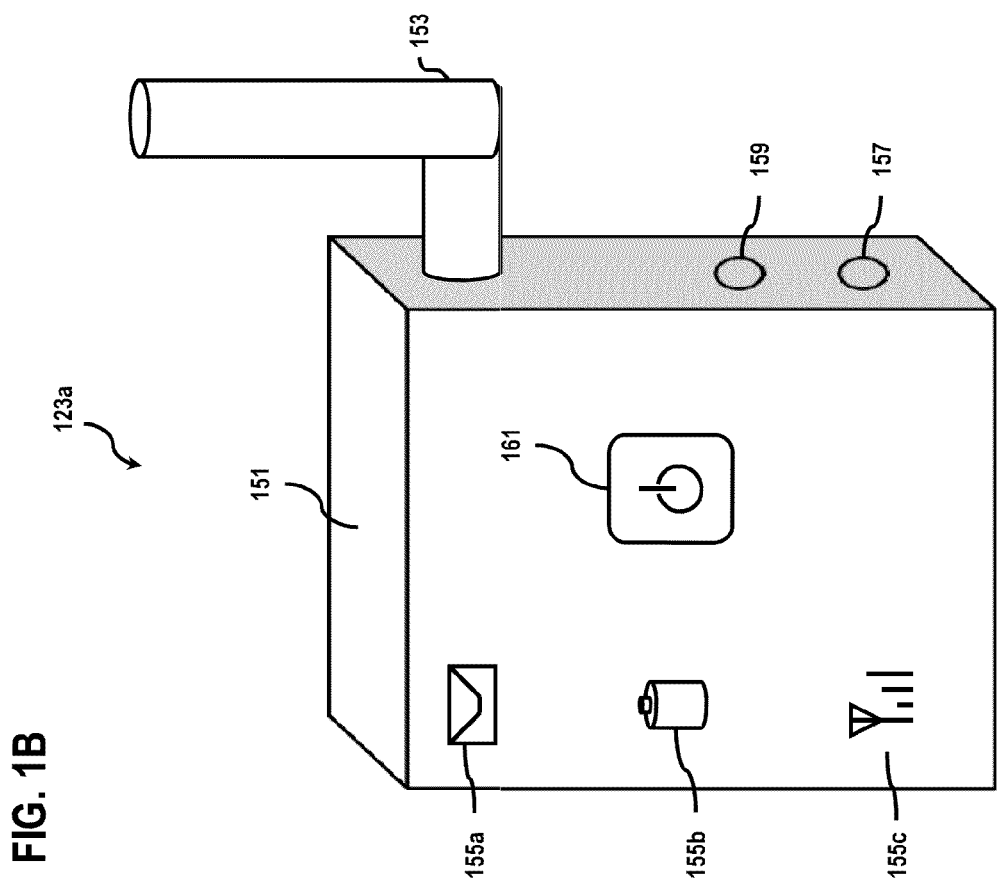

FIG. 1B illustrates a wireless device 123a, according to one embodiment. By way of example, the wireless voice device 123a may be installed inside the subscriber premises 111a. Alternatively, the wireless device 123a may be installed outside the subscriber premises 111a to improve wireless signal reception. The wireless device 123a may include a main body 151 and an antenna 153. The main body 151 may include one or more indicators 155a-155c, such as a voice message indicator 155a, a battery status indicator 155b (for a battery powered and/or battery backup) and a wireless signal strength indicator 155c. The voice message indicator 155a may indicate one or more received voice messages that a subscriber has yet to listen to or otherwise access (e.g., at an online voicemail service). The battery status indicator 155b may indicate a level or amount of battery charge remaining (e.g., by one or more scales for measuring battery charge), or whether the batteries require replacement (e.g., by blinking). The signal strength indicator 155c may indicate the strength of the wireless signal between the wireless voice device 123a and a nearby radio base station (not shown for illustrative convenience). The wireless device 123a may further include various power and communication ports/receptors. In one embodiment, the wireless voice device 123a may include a power port 157 for receiving electrical power via an external power supply (not shown for illustrative convenience). The wireless device 123a may also include one or more communication line ports 159 to connect to various POTS devices (e.g., voice terminal 115a) via the telephone wiring (not shown for illustrative convenience) at the subscriber premises 111. By way of example, the communication line ports 159 may include one or more RJ-11 telephone connectors. In one embodiment, the wireless device 123a may also include an ON/OFF switch 161 to selectively power the device on or off.

The wireless device 123a may be powered by an external power source (e.g., the electrical system of the subscriber premises 111a) through the power port 157 or by an internal power source (e.g., battery-powered), or both (e.g., having a battery backup in the event of a loss of power at the subscriber premises 111a). By way of example, the wireless device 123a may include the battery backup such that, if there is an extended power outage that affects the subscriber premise 111, the subscriber can extend the life of the wireless device 123a simply by changing the batteries until power is restored. The batteries of a battery-powered and/or battery-backup wireless device 123 may be chargeable or non-chargeable. It is contemplated that the batteries may be of any type (e.g., nickel-cadmium, lithium-ion, etc.) as well as of any size or number (e.g., 4.5/9 volts, D, C, AA, AAA, etc.). In one embodiment, the subscriber may be responsible for maintaining the batteries, which may involve routinely changing or recharging the batteries depending on usage characteristics and battery performance. However, it is contemplated that the batteries and/or the wireless device 123a may be designed with sufficient respective capacity and/or performance characteristics to obviate frequent replacement or recharging.

In one embodiment, the wireless device 123 may be included or be a part of the voice terminals 115. FIG. 1C illustrates a voice terminal 115c in which a conventional telephone has been adapted to incorporate the wireless device 123. Thus, the voice terminal 115c may include the functionality of the wireless device 123 in addition to that of a POTS telephone handset. If the telephone wiring of the subscriber premises is degraded or damaged, replacement of the existing POTS service by the voice terminal 115c may result in further improved quality of service because the telephone wiring of the subscriber premises 111 will be bypassed entirely. In one embodiment, the voice terminal 115c including the wireless device 123 may be configured to backlight the POTS service wiring of the subscriber premise 111 such that other voice terminals connected to the same POTS service wiring of the subscriber premise 111 can access the wireless service through the voice terminal 115c. Although shown as incorporated into a corded telephone, the wireless device 123 may alternatively be incorporated into a cordless telephone, such as in the base unit.

In one embodiment, the wireless device 123 may include a position sensor 127 to provide detailed positioning information, including latitude, longitude and/or altitude. The position of the wireless device 123 may be determined by various positioning systems, including global positioning system (GPS), global navigation satellite system (GLONASS), among others.

In one embodiment, the subscriber migration platform 101 may offer subscribers located in areas with optical fiber network access a migration path that would convert their POTS service to a fiber-based voice service (e.g., voice over IP (VoIP) and/or time division multiplexed (TDM) voice over FTTH). As part of the migration pathway, the subscriber migration platform 101 may determine an estimated cost to the service provider to transition to the new service and compare it to the current cost of maintaining the POTS service in working order. In one embodiment, the subscriber migration platform 101 may determine if the cost of upgrading the subscriber from POTS to the optical fiber network will cost more or less than the current cost of maintaining the POTS line in working order. By way of example, an optical network terminal (ONT) 129 installed at the subscriber premises 111*b* may convert between the voice band signals of the voice terminal 115*b* and an FTTH connection 131.

In one embodiment, the subscriber migration platform 101 may establish a new record in the voice services database 119 when the subscriber accepts the terms of the alternative service. Migration from one service to another may require transferring information from an existing record to a new record or merging the existing subscriber record with a newly generated record. The new record may include a new account number as well as merged profile information associated with the decommissioned POTS account. As mentioned earlier, the voice services database 119 may maintain the records associated with all voice services offered by the service provider. Doing so allows a more efficient conversion from one type of voice service to another.

As shown, the subscriber migration platform 101 may be connected to an emergency solutions vendor 133 (e.g., TCS®, Intrado®) via a network interface 135. In one embodiment, the emergency solutions vendor 133 may maintain an emergency services database 137 holding location information for subscribers to the service provider's voice services. The location information may include a civic address associated with a subscriber premise. In one embodiment, the civic address may be looked up by the subscriber migration platform 101 and used to forward an emergency 9-1-1 call to a public safety answering point. During subscriber migration, the subscriber migration platform 101 may securely update the emergency services database 137 via network interface 135. In one embodiment, the network interface 135 may include a virtual private network (VPN) connection and specific protocols to ensure that the information maintained by the emergency solutions vendor 133 is correct. As a result, emergency solution vendors 133 may continue to relay the location of the caller to a public safety answering point (PSAP) (not shown for illustrative convenience) following subscriber migration to an alternative access network. Further, it is contemplated that the subscriber premise equipment (e.g., ONT 129 or wireless voice device 123) may be selectively or permanently associated with a particular location or an address (e.g., subscriber premise 111) to facilitate and comply with the reliable operation of such emergency services.

As shown, the subscriber migration platform 101 may include, or be connected to, a device profile database 139. In one embodiment, the device profile database 139 may store the configuration information for the subscriber premises equipment (e.g., ONT 129 and wireless voice device 123). This may include a unique device identifier (e.g., an electronic serial number (ESN) or mobile equipment identifier (MEID)), a physical address or location associated with the device, as well as various features of the device. By way of example, device features may include three-way calling, caller-id, call forwarding, caller blocking, call waiting, voicemail, call assistant, busy redial, speed dial, unified voice mail services, distinctive ring styles, call intercept, and anonymous call rejection. In one embodiment, the subscriber migration platform 101 may utilize the device identifier to obtain the features supported by the subscriber premises equipment.

In one embodiment, a LEC sub-division (not shown for illustrative convenience) of the service provider may purchase network capacity from other sub-divisions (not shown for illustrative convenience) at wholesale rates. By way of example, the LEC sub-division may purchase bandwidth capacity according to various service level agreements (SLAs) from the alternative networks and then manage the purchased capacity to suit the business and technical requirements of the LEC sub-division. For example, the LEC sub-division may independently develop various product offerings at various price points in order to make the transition from POTS to the wireless service attractive to its subscribers while achieving a desired level of profitability. The subscriber migration platform 101 may determine whether to tag a particular subscriber's account based on an analysis of the cost of maintaining POTS service for a particular subscriber and the pricing information of various alternative service offerings.

Figure 2:
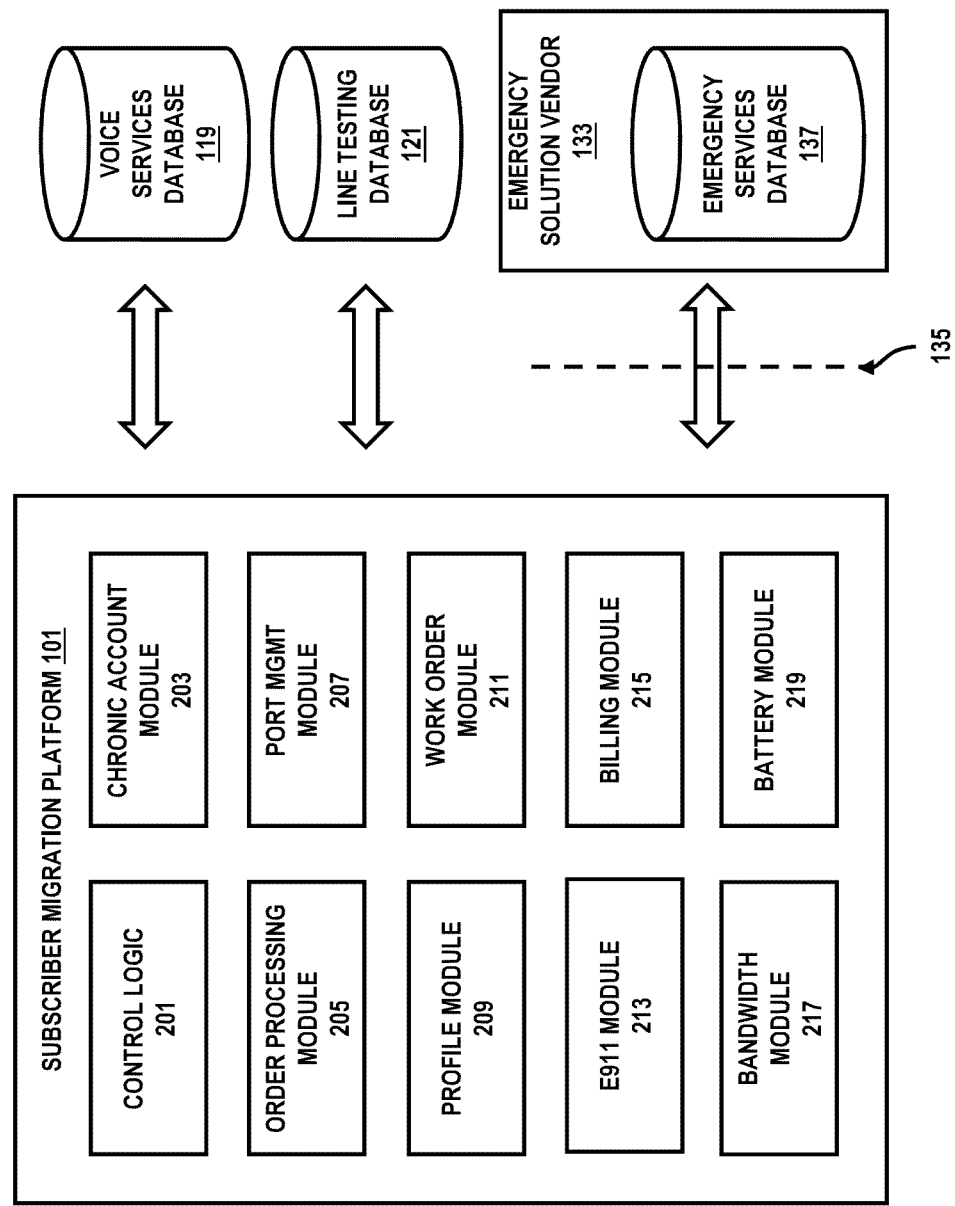
FIG. 2 is a diagram of the components of a subscriber migration platform, according to one embodiment.

FIG. 2 is a diagram of the components of subscriber migration platform 101, according to one embodiment. By way of example, the subscriber migration platform 101 includes one or more components for providing subscriber migration to an alternative access network. It is contemplated that the functions of these components may be combined in one or more components or performed by other components of equivalent functionality. In this embodiment, the subscriber migration platform 101 includes a control logic module 201, a chronic account module 203, an order processing module 205, a port management module 207, a profile module 209, a work order module 211, an emergency 911 (E911) module 213, a billing module 215, a bandwidth module 217, and a battery module 219.

The control logic module 201 oversees tasks, including tasks performed by the chronic account module 203, order processing module 205, port management module 207, profile module 209, work order module 211, E911 module 213, billing module 215, bandwidth module 217, and battery module 219. For example, although the other modules may perform the actual task, the control logic module 201 may determine when and how those tasks are performed or otherwise direct the other modules to perform the task.

The control logic module 201 may use the chronic account module 203 to determine that a subscriber premise is associated with a chronic account. The chronic account module 203 may make this determination based on various sources of information. In one embodiment, the chronic account module 203 may query or otherwise access a voice service database (e.g., voice service database 119) to obtain a history of previously reported faults. For example, a subscriber record for a particular subscriber may be accessed to determine the type and number of faults associated with the subscriber premise.

The chronic account module 203 may analyze this fault information to determine if the number or frequency of faults satisfies a threshold. By way of example, if the subscriber record indicates that the number of faults associated with degraded copper service is greater than a threshold value, the chronic account module 203 may tag the subscriber record as a chronic account. In one embodiment, the chronic account module 203 may determine that a subscriber premise is associated with a chronic account based on line quality testing data. For example, the chronic account module 203 may access or otherwise query a line testing database (e.g., line quality database 121) to obtain testing data for a particular subscriber premise. As mentioned earlier, the service provider may regularly conduct line (or voice) quality tests on its copper-based voice network and store the results in a testing database (e.g., line testing database 121). Alternatively, it contemplated that the chronic account module 203 may cause to request that a test be conducted to obtain line quality data for a particular subscriber.

The control logic module 201 may use the order processing module 205 to process an order to migrate a subscriber premise from a wireline voice service network to an alternative access network. In one embodiment, the order processing module 205 receives and processes order to migrate the subscriber premise associated with a chronic account from a wireline voice service network to a wireless voice service network. The order processing module 205 may use the port management module 207, work order module 211, billing module 215 and/or the profile module 209 to manage the subscriber migration. In one embodiment, upon determination by the chronic account module 203 that the subscriber premise is associated with a chronic account and upon obtaining the consent of the subscriber, the control logic module 201 may use the order processing module 205 to migrate the subscriber to an alternative access network. In one embodiment, the control logic module 201 may use the order processing module 205 to deactivate a wireline voice service associated with a chronic account. Upon completion of the order, the order processing module 205 may indicate to the control logic module 201 a successful completion of the order. It is contemplated that the order processing module 205 may utilize one or more specific codes to identify an order as a subscriber migration order. In one embodiment, the order processing module 205 may apply distinctive codes for a migration to a wireless voice network. It may also track specific orders based on an order number or other identifier. In one embodiment, the order processing module 205 may track a status of an order and control the specific steps necessary to complete an order in order to ensure proper workflow. By way of example, the order processing module 205 may place a hold on further processing when an intermediate stage in the order requires a work order to be completed by manual labor (e.g., wireless voice device installer/technician).

The control logic module 201 may use the port management module 207 to manage the provisioning of ports on the service provider side of an access network. In one embodiment, the port management module 207 may provision a new wireless port for a subscriber premise that is being migrated. The port management module 207 may communicate with various provisioning systems on the wireless voice network to provision the port. The port management module 207 may also be used to deactivate or release a port. By way of example, a wireline port may be released following subscriber migration. In one embodiment, the port management module 207 may also be used to detect the presence of an active wireless voice device (e.g., wireless voice device 123) at the subscriber premise (e.g., subscriber premise 111a) after a work order to install the device has been completed. The port management module 207 may also receive from a wireless voice device information regarding the amount of charge remaining on a battery powering the wireless voice device. In one embodiment, the port management module 207 may use the battery module 219 to determine if the charge of the battery is low. If the charge is low, the port management module 207 may cause the wireless voice device to indicate to the subscriber a low battery charge by means of a visual indicator (e.g., battery indicator 155b).

The control logic module 201 may use the profile module 209 to manage profiles or records of subscribers in a voice service database. The profile module 209 may be used to create a new subscriber record in a voice services database for a subscriber migration to an alternative access network. In one embodiment, the profile module 209 is used to update the new subscriber record in the voice services database 119 with a civic address of the subscriber premise. The profile module 209 may also transfer account information (e.g., device profile, subscriber profile information) for a chronic account from an existing subscriber record in the voice services database 119 to the new subscriber record. It is contemplated that the profile module 209 may be used to manage subscriber records spread across multiple databases.

The control logic module 201 may use the work order module 211 to generate and submit work orders relating to a subscriber migration. As used herein, the term "work order" refers to an order to members of the service provider's workforce, including installation technicians, line quality testing personnel, network management personnel, etc. In one embodiment, the work order module 211 may be used to order an installation of the wireless voice device 123 at the subscriber premise 111a. The progress of a work order may be tracked by the work order module 211 via status updates input at a technician's mobile terminal (e.g., laptop computer loaded with customized provisioning software for technician use).

The control logic module 201 may use the E911 module 213 to configure and manage 9-1-1 emergency call routing and forwarding to a PSAP via one or more emergency solution vendors (e.g., TCS®, Intrado®). In one embodiment, the E911 module 213 may provision the 9-1-1 data for a subscriber migrating from a wireline voice network to a wireless voice network. By way of example, the 9-1-1 data may include a telephone number associated with the wireless voice device 123 and a civic address associated with the subscriber premise 111a. In one embodiment, the E911 module 213 may be used to return the civic address associated with the subscriber premise 111a when the subscriber makes an emergency 9-1-1 call from the subscriber premise 111a via the wireless network 109. In one embodiment, the emergency solution vendor 133 may forward the civic address to a PSAP, which may provide information to route the emergency 9-1-1 call to the PSAP. In one embodiment, the E911 module 213 communicates with the emergency solution vendor 133 via the network interface 135 coupling the service provider network 103 and the solution vendor 133. In one embodiment, the E911 module 213 will treat an emergency 9-1-1 call as a native wireless call if the civic address for the caller is not available in the emergency services database 137. Thus, the E911 module 213 may instead retrieve the location of the base station to route the call to a PSAP.

The control logic module 201 may use the billing module 215 to transfer usage and billing information from a wireline voice service to a wireless voice service. As used herein, the term "usage" refers to usage of a voice network by a subscriber and may include itemized call and duration information. As used herein, the term "billing" may refer to the processing of usage information to generate a bill for a subscriber at the end of a billing cycle (e.g., 1 month). In one embodiment, the billing module 215 may be used to disassociate a chronic account from a first billing system (e.g., a LEC billing system) and transfer an unpaid balance to a second billing system for a wireless voice network. By way of example, the billing module 215 may be used to transfer any balance on a chronic account associated with a wireline voice network at the time an order is received to deactivate the wireline voice service. After migration, the billing system for the wireless voice network may utilize the billing and usage information to generate a bill at the end of the regularly scheduled billing cycle.

The control logic module 201 may use the bandwidth module 217 to apportion wireless bandwidth obtained from a wireless service provider among one or more service levels. As previously mentioned, the sub-division operating the wireline voice network may purchase or otherwise obtain an allocation of wireless bandwidth for migrating subscribers. In one embodiment, the bandwidth module 217 may provision the migration of a subscriber to a wireless voice network based on a plurality of service levels.

The control logic module 201 may use the battery module 219 to monitor the amount of charge remaining on a wireless voice device installed at a subscriber premise. In one embodiment, the battery module 219 may receive an indication from the wireless voice device 123 that the amount of charge is low. The battery module 219 may indicate the low charge to the subscriber via a visual indicator (e.g., battery indicator 155*c*) on the wireless voice device 123*a*. In one embodiment, the battery module 219 may obtain contact information for the subscriber by querying or otherwise accessing the voice service database 119. Thus, the battery module 219 may alert the subscriber via email, SMS text message, or via any other alternative contact method.

Figure 3A:
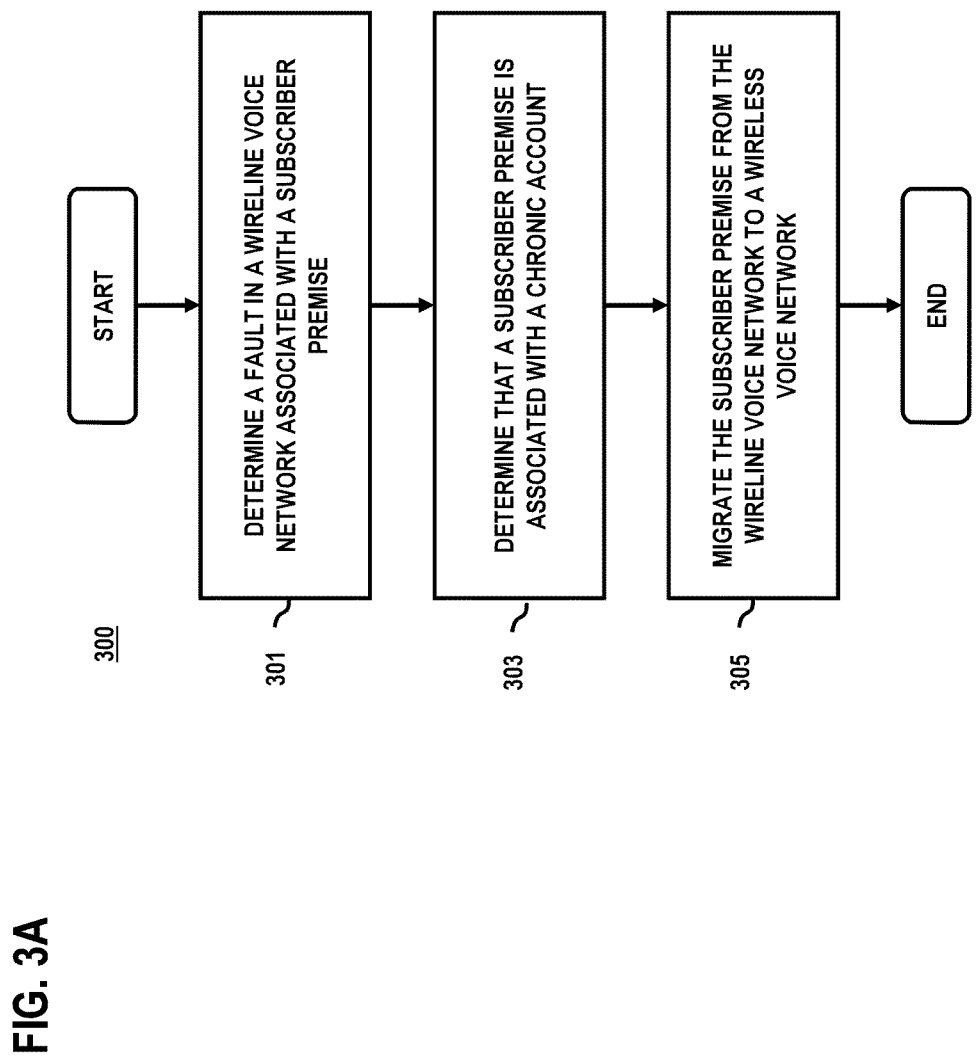
Figure 7:
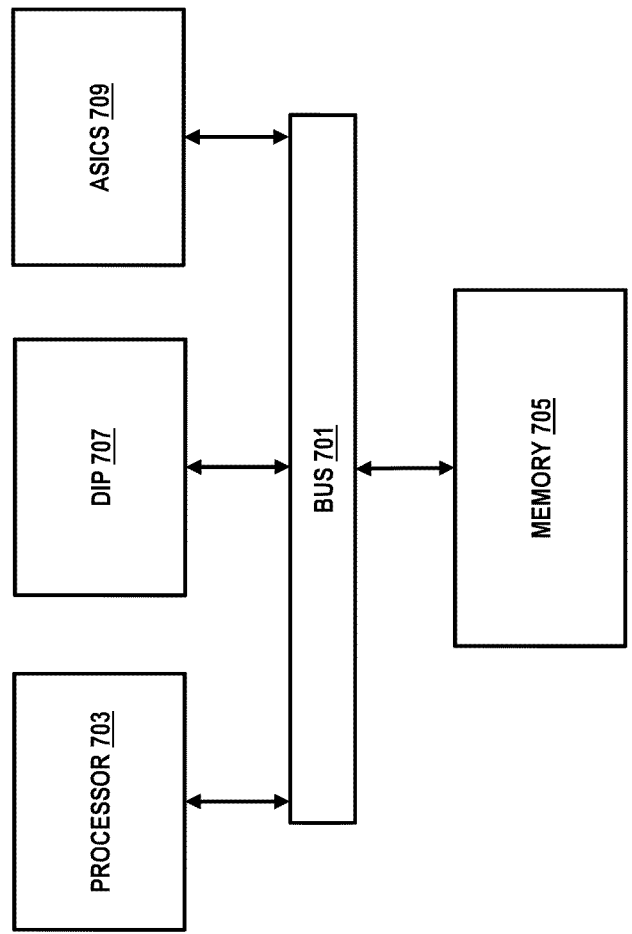
FIG. 7 is a diagram of a chip set that can be used to implement various exemplary embodiments.

FIG. 3A is a flowchart of a process 300 for subscriber migration to an alternative access voice network, according to one embodiment. In one embodiment, the chronic account module 203, order processing module 205, port management module 207, profile module 209, work order module 211, E911 module 213, billing module 215, bandwidth module 217, and battery module 219 in FIG. 2 perform the process 300 and are implemented in, for instance, a chip set including a processor and a memory as shown in FIG. 7.

In step 301, the subscriber migration platform 101 determines a fault in a wireline voice network associated with a subscriber premise. For example, the subscriber migration platform 101 may determine that a subscriber on the telephony network 105 is experiencing voice quality issues. In one embodiment, the subscriber migration platform 101 may receive an indication from a customer agent 113 interacting with the subscriber. It is contemplated that the subscriber may utilize one of various means to report the issue to the service provider. By way of example, the subscriber may call the service provider and interact with an automated or live customer agent in a customer support center. Alternatively, the subscriber may indicate the fault to the service provider via an online service portal (e.g., web-based form). In one embodiment, the subscriber migration platform 101 may determine a fault based on line quality testing data collected and stored by the service provider during automated or manual line testing. For example, the service provider may regularly test line quality as measured by attenuation, echo, noise, interference, etc. as part of its maintenance duties. In one embodiment, the subscriber migration platform 101 may query or otherwise access the line testing database 121 to retrieve testing data and any observed failures. In one embodiment, the subscriber migration platform 101 may determine a fault in the wireline voice network based on the location of the subscriber premise. For example, in the case of a natural disaster (e.g., hurricane, blizzard) the subscriber migration platform 101 may determine a fault if the subscriber premise is located within an affected region. The subscriber migration platform 101 may search the voice services database 119 to obtain a list of subscribers located within the affected region by querying the database 119 based on one or more partial addresses corresponding to the affected region.

In step 303, the subscriber migration platform 101 determines that a subscriber premise is associated with a chronic account. In one embodiment, the subscriber migration platform 101 queries or otherwise accesses the voice services database 119 to retrieve a subscriber record for a subscriber premise (e.g., subscriber premise 111*a*). In one embodiment, the subscriber premise is associated with a chronic account if the subscriber record indicates that the number of faults reported or observed at this subscriber premise satisfies a threshold. Alternatively, the subscriber migration platform 101 may automatically determine that a subscriber premise is associated with a chronic account if step 301 indicates that the subscriber premise is located within an affected region. As previously mentioned, the voice services database 119 may maintain a record of observed faults in the past, including their severity, type, frequency and/or duration. In one embodiment, the subscriber migration platform 101 may tag the subscriber record to indicate that it is a chronic account. The subscriber migration platform 101 may also be configured to recognize symptoms of degraded copper based on various indicators (e.g., noise, attenuation, static, weather-dependency, etc.). Each time the subscriber migration platform 101 recognizes the same issue, it may update various statistics to keep track of the frequency and duration of degraded service in addition to maintaining a count of the number of times a particular issue has been reported. If one or more metrics exceeds a threshold value, the subscriber migration platform 101 may tag the account and indicate the tag information to a customer agent (e.g., customer agent 113) when assisting the subscriber.

In step 305, the subscriber migration platform 101 migrates the subscriber premise from the wireline voice network to a wireless voice network. Subscriber migration may involve provisioning a wireless port, generating a work order for the installation of a wireless voice device, creating a new subscriber record in a voice services database, and importing (or transferring) billing information from the wireline voice network. In addition, migration may involve configuring and activating an emergency service by updating the databases for an emergency solutions vendor (e.g., TCS®, Intrado®). After provisioning the wireless voice network and the associated billing and emergency systems, the subscriber migration platform 101 may deactivate the wireline voice service from which the subscriber is being migrated. In one embodiment, the wireline port may be released and any billing records expunged from the billing system of the wireline voice network. In order to ensure a smooth migration, the wireline service may remain active until an activation signal is received by the subscriber migration platform 101 from the installed wireless voice device.

FIG. 3B is a flowchart of a process 310 for determining that a subscriber premise is associated with a chronic account, according to one embodiment. In one embodiment, the chronic account module 203 in FIG. 2 performs the process 310 and is implemented in, for instance, a chip set including a processor and a memory as shown in FIG. 7. In step 311, the subscriber migration platform 101 may query a voice service database for a subscriber record associated with the subscriber premise. For example, the subscriber migration platform 101 may query the voice services database 119 to obtain the subscriber record based on an address or a telephone number associated with the record. In step 313, the chronic account module 203 may determine that the fault causes a number of faults associated with the subscriber record to satisfy a threshold. In one embodiment, the chronic account module 203 may analyze the frequency with which a particular fault (e.g., attenuation (e.g., low volume), noise (e.g., excessive static), etc.) has been reported for the subscriber premise 111*a*. The number of faults may satisfy a threshold if the same or similar issue symptomatic of a degraded copper network has been reported more than a certain number of times within a certain period. In step 315, the chronic account module 203 may associate the subscriber premise with a chronic account. In one embodiment, the subscriber migration platform 101 may tag the subscriber record to indicate that it is chronically affected by copper degradation and is a suitable candidate for migration to an alternative access network.

FIG. 3C is a flowchart of a process 320 for determining that a subscriber premise is associated with a chronic account, according to an alternative embodiment. In one embodiment, the chronic account module 203 in FIG. 2 performs the process 310 and is implemented in, for instance, a chip set including a processor and a memory as shown in FIG. 7. In step 321, the subscriber migration platform 101 performs or causes to perform a line quality test on the wireline voice network associated with the subscriber premise. As previously mentioned, the service provider of the wireline voice service may routinely conduct non-disruptive voice quality testing over its copper-based access network. Alternatively, line quality data may be collected by personnel during maintenance and entered into a database (e.g., line testing database 121) after systematic categorization of the data according to type of fault, date, location, subscriber telephone number, etc. In step 323, the subscriber migration platform 101 determines that a subscriber premise is associated with a chronic account based on the results of the line quality test. The chronic account module 203 may analyze the collected test data for a particular subscriber and determine that the account be tagged as a chronic account. For example, the test data may indicate that attenuation has been observed consistently and at various times. Thus, the chronic account module 203 may determine that the subscriber premise served by the copper connection (e.g., copper connection 117*a*) is a suitable candidate for migration to an alternative access network.

Figure 3D:
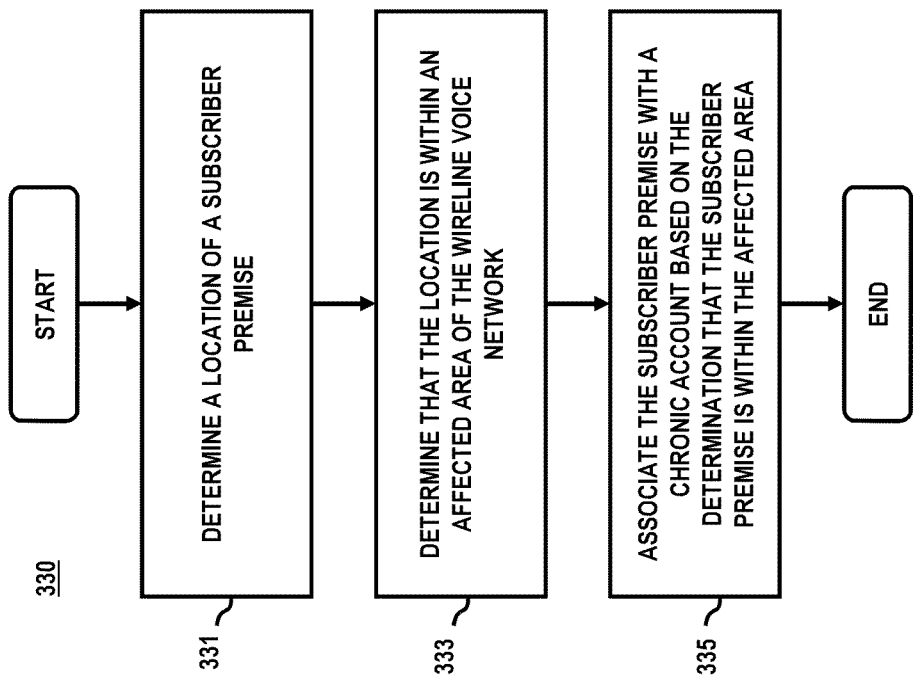

FIG. 3D is a flowchart of a process 330 for determining that a subscriber premise is associated with a chronic account, according to another alternative embodiment. In one embodiment, the chronic account module 203 in FIG. 2 performs the process 310 and is implemented in, for instance, a chip set including a processor and a memory as shown in FIG. 7. In step 331, the subscriber migration platform 101 determines a location of a subscriber premise. The location may be indicated by a complete or partial street address (e.g., postal zip code). Alternatively, the location may be provided in other coordinate mapping systems, including proprietary (e.g., telecommunication service areas) and public geographic mappings (e.g., latitude, longitude). In step 333, the subscriber migration platform 101 determines that the subscriber premise is within an affected area of the wireline voice network. In one embodiment, an affected area may correspond to areas that are distant from the nearest CO and are only served by the service provider's copper-based infrastructure (copper-only subscribers). In another embodiment, an affected area may be determined as an area of widespread service outage as a result of a natural disaster (e.g., hurricane, storm) or catastrophic network failure (e.g., due to a major power outage). In step 335, the subscriber migration platform 101 associates the subscriber premise with a chronic account based on the determination that the subscriber premise is within the affected area. In one embodiment, the subscriber record associated with the subscriber premise is tagged to indicate that it is a chronically affected account.

FIG. 3E is a flowchart of a process 340 for provisioning a wireless port on the network side of a wireless voice network, according to one embodiment. In one embodiment, the order processing module 205, the port management module 207, the work order module 211, the profile module 209, and the E911 module 213 in FIG. 2 perform the process 340 and is implemented in, for instance, a chip set including a processor and a memory as shown in FIG. 7.

In step 341, the subscriber migration platform 101 receives an order to migrate the subscriber premise from a wireline voice network to a wireless voice network. The order may originate from a customer agent (e.g., customer agent 113) that has obtained the consent of a subscriber to migrate to an alternative access network. For example, a subscriber may have contacted the service provider's customer support center to report poor voice quality after a recent storm. During their conversation, a customer agent may have been prompted to present a migration path as an alternative to the existing copper-based voice service. Upon acceptance by the subscriber, the customer agent may have submitted an order according to the agreed migration path. In one embodiment, the order processing module 205 in FIG. 2 may have received the order.

In step 342, the subscriber migration platform 101 provisions a wireless port with a dummy equipment identifier. As used herein, a "dummy equipment identifier" refers to a temporary identifier (e.g., serial number) used in place of the actual identifier of subscriber equipment. The wireless port may exist as a physical or virtual port on the service provider side of the wireless voice network. In one embodiment, the wireless ports may be managed by a different sub-division than the sub-division in which the subscriber migration platform 101 may reside. The port management module 207 in FIG. 2 may communicate via an intermediate system or a direct connection with the wireless port to initiate a provisioning process. In one embodiment, a dummy equipment identifier (e.g., temporary serial number) for the subscriber premise equipment is used to provision the wireless port.

In step 343, the subscriber migration platform 101 generates a work order to install a wireless voice device at the subscriber premise. In one embodiment, the work order module 211 in FIG. 2 generates an automated request to install a wireless voice device at the subscriber premise. The request may include a civic address associated with the subscriber premise as well as any other details (e.g., time of service request) that may be necessary to obtain management/labor authorization.

In step 344, the subscriber migration platform 101 receives an activation signal from the wireless voice device including the actual equipment identifier. After installation of the wireless voice device (e.g., wireless voice device 123), the port management module 207 in FIG. 2 may receive an indication (e.g., an activation signal issued by the wireless voice device 123) that the wireless (or, alternatively, optical) access connection is active. In step 345, the subscriber migration platform 101 updates the wireless port data to replace the dummy equipment identifier with the actual equipment identifier. In one embodiment, the port management module 207 in FIG. 2 receives the actual serial number of the wireless voice device over an in-band connection and uses it to update data regarding the wireless port information.

In step 346, the subscriber migration platform 101 updates the new subscriber record in the voice service database with the civic address of the subscriber premise. In one embodiment, the profile module 209 in FIG. 2 records the civic address for the subscriber premise in the voice services database 119, thus associating the subscriber record with the correct address information.

In step 347, the subscriber migration platform 101 updates a subscriber record in an emergency subscriber profile database via a network interface coupling a wireline voice network and an emergency services vendor. In one embodiment, the E911 module 213 in FIG. 2 updates the information relating to the subscriber in the emergency services database 137 via network interface 135. The update to the information may occur via a secure private connection according to one or more protocols negotiated with the emergency solutions vendor 133. Specifically, it is contemplated that the protocols will allow the emergency solution vendor to identify the voice service being provisioned as a wireless voice service installed at a subscriber premise. In one embodiment, the emergency solutions vendor 133 may thus be able to forward a civic address instead of the location of a cell tower when an emergency 9-1-1 call is received by the service provider. It is contemplated that the emergency solutions vendor 133 may implement a backup plan to treat an emergency 9-1-1 call from the wireless voice device 123 as a native wireless call if the emergency services database 137 cannot provide a civic address.

Figure 3F:
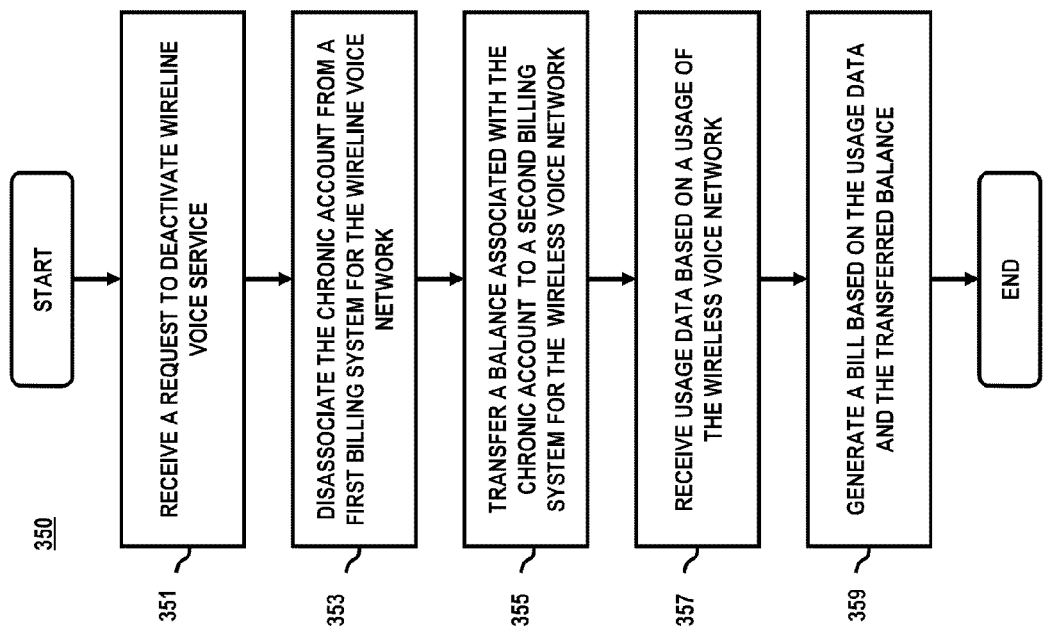

FIG. 3F is a flowchart of a process 350 for transferring billing information for a subscriber migration, according to an embodiment. In one embodiment, the order processing module 205 and the billing module 215 in FIG. 2 perform the process 350 and is implemented in, for instance, a chip set including a processor and a memory as shown in FIG. 7. In step 351, the subscriber migration platform 101 receives a request to deactivate a wireline voice service. In one embodiment, the request to deactivate the wireline voice service may be received only after the wireless voice device 123 has been installed at the subscriber premise 111a and a wireless port has been provisioned. In one embodiment, the order processing module 205 in FIG. 2 receives the request to deactivate the wireline voice service.

In step 353, the subscriber migration platform 101 disassociates the chronic account from a first billing system for the wireline voice network. As previously mentioned, there may be separate billing systems for each sub-division of the service provider. Specifically, a LEC sub-division may maintain an independent billing system in order to comply with various telecom regulations and its internal accounting systems. In one embodiment, the billing module 215 in FIG. 2 causes to disassociate or disconnect the LEC billing system from a subscriber record corresponding to the chronic account.

In step 355, the subscriber migration platform 101 transfers a balance associated with the chronic account to a second billing system for the wireless voice network. Therefore, usage monitoring is brought to an end. Any unpaid balance may be totaled for separate billing in a subsequent statement that will be issued by the operator of the alternative access network. In one embodiment, the billing module 215 in FIG. 2 causes any unpaid balance residing on the LEC billing system to be transferred to the billing system of the alternative access network.

In step 357, the subscriber migration platform 101 receives usage data based on a usage of the wireless voice network. In one embodiment, the usage data for the alternative access network (e.g., wireless network 109) may have begun at the time the wireless voice device 123 was activated and the LEC billing systems were disassociated. In step 359, the subscriber migration platform 101 generates a bill based on the usage data and the transferred balance. In one embodiment, the billing module 215 in FIG. 2 generates the bill at the end of the current billing cycle, but is careful not to include any charges associated with the old copper-based voice service that cannot be carried over (e.g., LEC tax charges). In one embodiment, the generated bill may include a helpful mapping of the features of the new service to those of the old copper-based voice service and an indication as to those features or charges that are not carried over from the copper-based voice service.

Figure 3G:
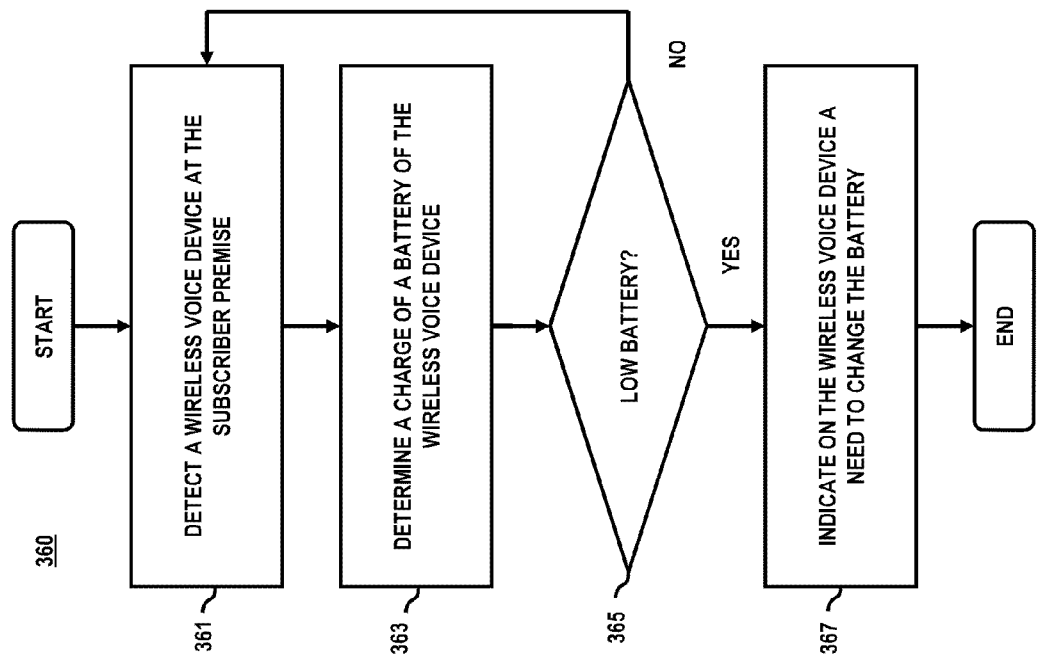

FIG. 3G is a flowchart of a process 360 for monitoring a battery of wireless voice device. In one embodiment, the port management module 207 and the battery module 219 in FIG. 2 perform the process 360 and is implemented in, for instance, a chip set including a processor and a memory as shown in FIG. 7. In step 361, the subscriber migration platform 101 detects a wireless voice device at the subscriber premise. In one embodiment, the port management module 207 in FIG. 2 is capable of detecting when the service personnel have successfully installed the wireless voice device 123 at the subscriber premise 111a. For example, the wireless voice device 123 may emit an activation signal. In one embodiment, the wireless voice device 123 may also transmit various other in-band metadata or control information informing the wireless port on the service provider network 103 of the health of various sub-systems. For example, the battery health may be indicated to the subscriber migration platform 101 in order to alert the subscriber of a possible loss of power (and, thus, connectivity). In step 363, the subscriber migration platform 101 determines a charge of a battery of the wireless voice device. In one embodiment, the battery module 219 in FIG. 2 parses or otherwise interprets the received in-band signaling from the wireless voice device 123 to determine an amount of charge remaining (or, alternatively, depleted). In step 365, the subscriber migration platform 101 determines whether the battery is low on charge. In one embodiment, the battery module 219 indicates that the battery is close to depletion if the remaining charge satisfies a threshold. Alternatively, the wireless voice device may emit a specific alert signal indicating a low battery charge or oncoming loss of power. Process 360 proceeds to step 367 if the battery charge is low; otherwise it returns to step 361 to continue monitoring the battery. In step 395, the subscriber migration platform 101 causes to indicate on the wireless voice device a need to change the battery. In one embodiment, the port management module 207 causes the wireless port on the service provider network 103 to emit a signal to turn on a warning indicator or message at the wireless voice device 123. Alternatively, the port management module 207 causes to send to the subscriber a message (e.g., email, SMS text) to alert the subscriber based on contact information obtained by querying the voice services database 119.

Figure 3H:
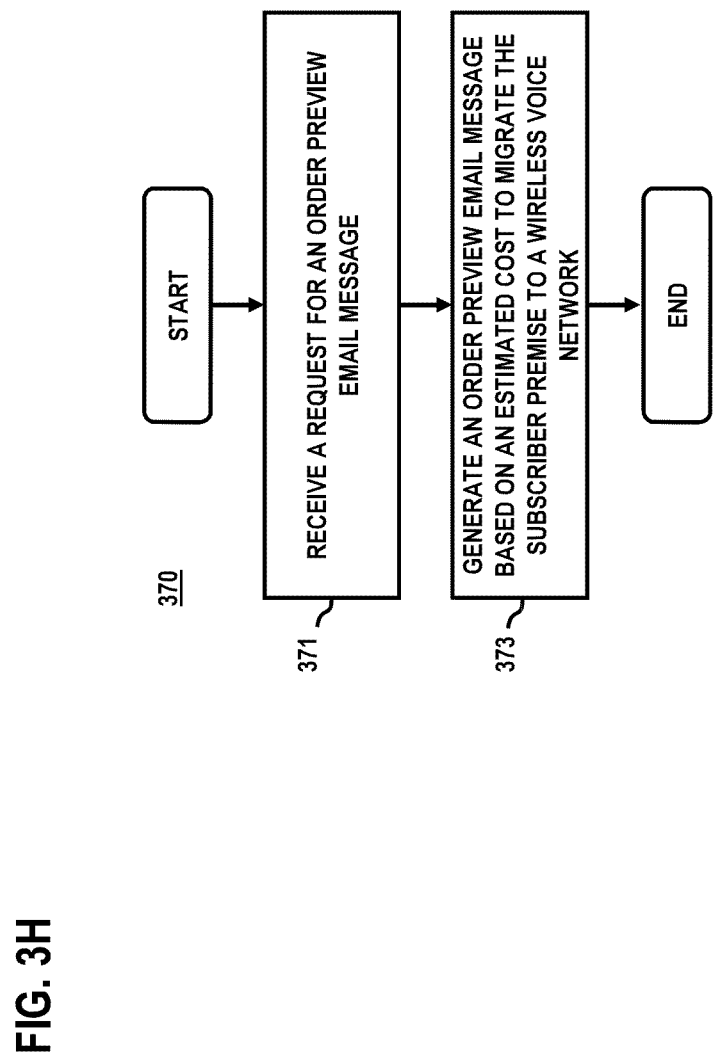

FIG. 3H is a flowchart of a process 370 for confirming acceptance of a migration path by a subscriber. In one embodiment, the order processing module 205 in FIG. 2 performs the process 370 and is implemented in, for instance, a chip set including a processor and a memory as shown in FIG. 7. In step 371, the subscriber migration platform 101 receives a request for an order preview email message. In one embodiment, the order processing module 205 in FIG. 2 may receive this request from a customer service representative (e.g., customer agent 113) interacting with the subscriber. Alternatively, the subscriber migration platform 101 may determine whether the subscriber has agreed to migrate to an alternative voice service via the subscriber's input to an interactive automated system. For example, an interactive automated system presents various service offerings and their pricing information to the subscriber and awaits the acceptance by the subscriber of one of these offerings. In step 373, the subscriber migration platform 101 generates an order preview email message based on an estimated cost to migrate the subscriber premise from the existing copper-based wireline voice service to a wireless voice network. In one embodiment, the order processing module 205 in FIG. 2 generates an email previewing the requested service. This preview email may contain a real-time price quote generated immediately (e.g., two to five seconds) after an initial acceptance. In one embodiment, the preview email details the estimated monthly charges for the alternative voice service. In one embodiment, the preview email also may provide a breakdown of one or more of promotional discounts, taxes, fees, and contract discounts. The preview email may also provide a price comparison of the new service compared to the subscriber's existing copper-based voice service. The price comparison may indicate any reduction in price based on the elimination of charges associated with traditional telecommunication service (e.g., LEC tax charges) and also a mapping of the features of the new service to those of the existing copper-based service. The preview email may also highlight those LEC features that will not be carried over to the new service. Any credits based on a subscriber incentivizing program may also be indicated in the calculated total charge for the new service. In one embodiment, the subscriber migration platform 101 may also cause the pricing information to be displayed at a customer representative terminal in order to facilitate the interaction between the subscriber and a live customer representative (e.g., customer agent 113).

Figure 4:
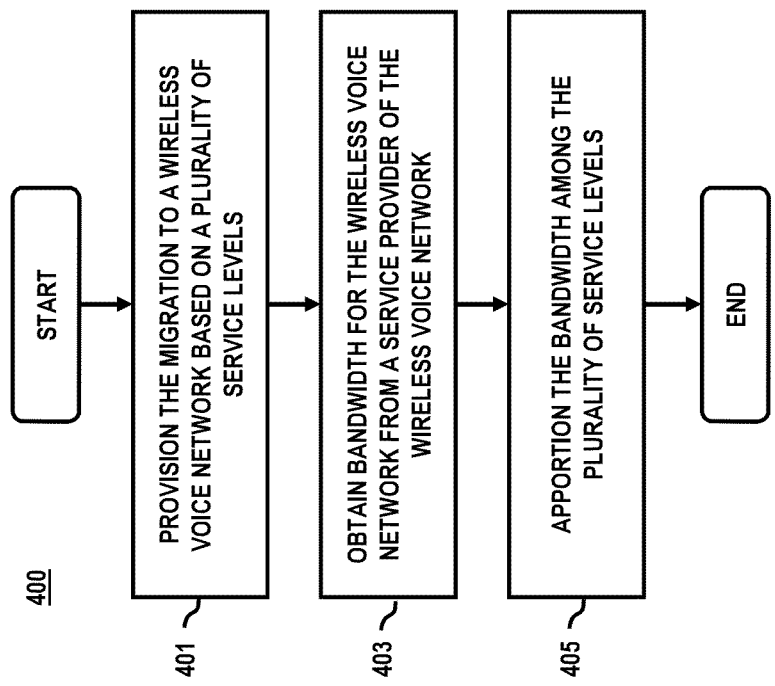
FIG. 4 is a flowchart of a process for obtaining bandwidth for a wireless voice network, according to an embodiment.

FIG. 4 is a flowchart of a process 400 for managing bandwidth in a wireless voice network, according to an exemplary embodiment. In one embodiment, the port management module 207 and the bandwidth module 217 in FIG. 2 perform the process 400 and is implemented in, for instance, a chip set including a processor and a memory as shown in FIG. 7. In step 401, the subscriber migration platform 101 provisions the migration to a wireless voice network based on a plurality of service levels. In one embodiment, the port management module 207 in FIG. 2 provisions a wireless port on the service provider's wireless voice network based on a selected service level. For example, the wireless voice service may be offered at various service levels (e.g., based on bandwidth reservation or coverage area). In step 403, the subscriber migration platform 101 obtains bandwidth for the wireless voice network from a service provider of the wireless voice network. As previously mentioned, the subscriber migration platform 101 may be a part of the copper-based wireline sub-division and may communicate with the service provisioning systems of the wireless voice network either directly or via an intermediate sub-division or umbrella organization. In one embodiment, the bandwidth module 217 in FIG. 2 may receive authorization to provision a wireless port on the wireless voice network based on an agreement between the sub-divisions. As used herein, the term "bandwidth" may refer to authorized access to one or more wireless ports and associated capacity at a wireless node (e.g., cell tower). In step 405, the subscriber migration platform 101 apportions the bandwidth among the plurality of service levels. In one embodiment, the bandwidth module 217 in FIG. 2 may further aggregate or package the authorized bandwidth as part of various commercial packages (e.g., basic, premium, regional, local, etc.) offered to consumers.

Figure 5:
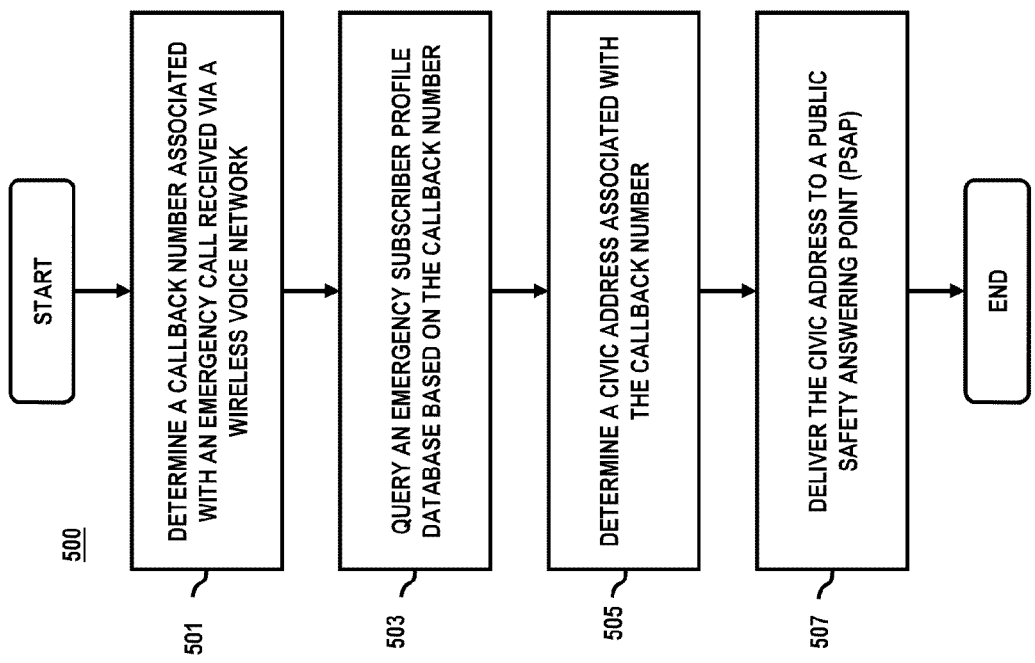
FIG. 5 is a flowchart of a process for forwarding an emergency 9-1-1 call from a wireless voice device, according to an embodiment.

FIG. 5 is a flowchart of a process 500 for processing an emergency 9-1-1 call from a wireless voice device, according to an embodiment. In one embodiment, the E911 module 213 in FIG. 2 performs the process 500 and is implemented in, for instance, a chip set including a processor and a memory as shown in FIG. 7. In step 501, the subscriber migration platform 101 determines a callback number associated with an emergency call. In one embodiment, the E911 module 213 in FIG. 2 determines the callback number based on in-band signaling received from the wireless voice device 123 via the wireless network 109. In step 503, the subscriber migration platform 101 queries or otherwise searches the emergency services database 137 using the callback number. In step 505, the E911 module 213 in FIG. 2 accesses the emergency services database 137 via network interface 135 to obtain the registered civic address (as discussed earlier in relation to FIG. 3E). In step 507, the subscriber migration platform 101 causes the civic address of the subscriber premise to be delivered to a PSAP. In one embodiment, the E911 module 213 in FIG. 2 causes the emergency solutions vendor 133 to forward the registered civic address to the PSAP. Subsequently, the PSAP may return the routing information necessary to route the emergency call to the PSAP. In one embodiment, if the emergency services database 137 does not contain a registered civic address, the E911 module 213 in FIG. 2 may cause the emergency solutions vendor 133 to forward the cell site location to the PSAP to be used instead as a means of routing the call.

The processes described herein for performing subscriber migration may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
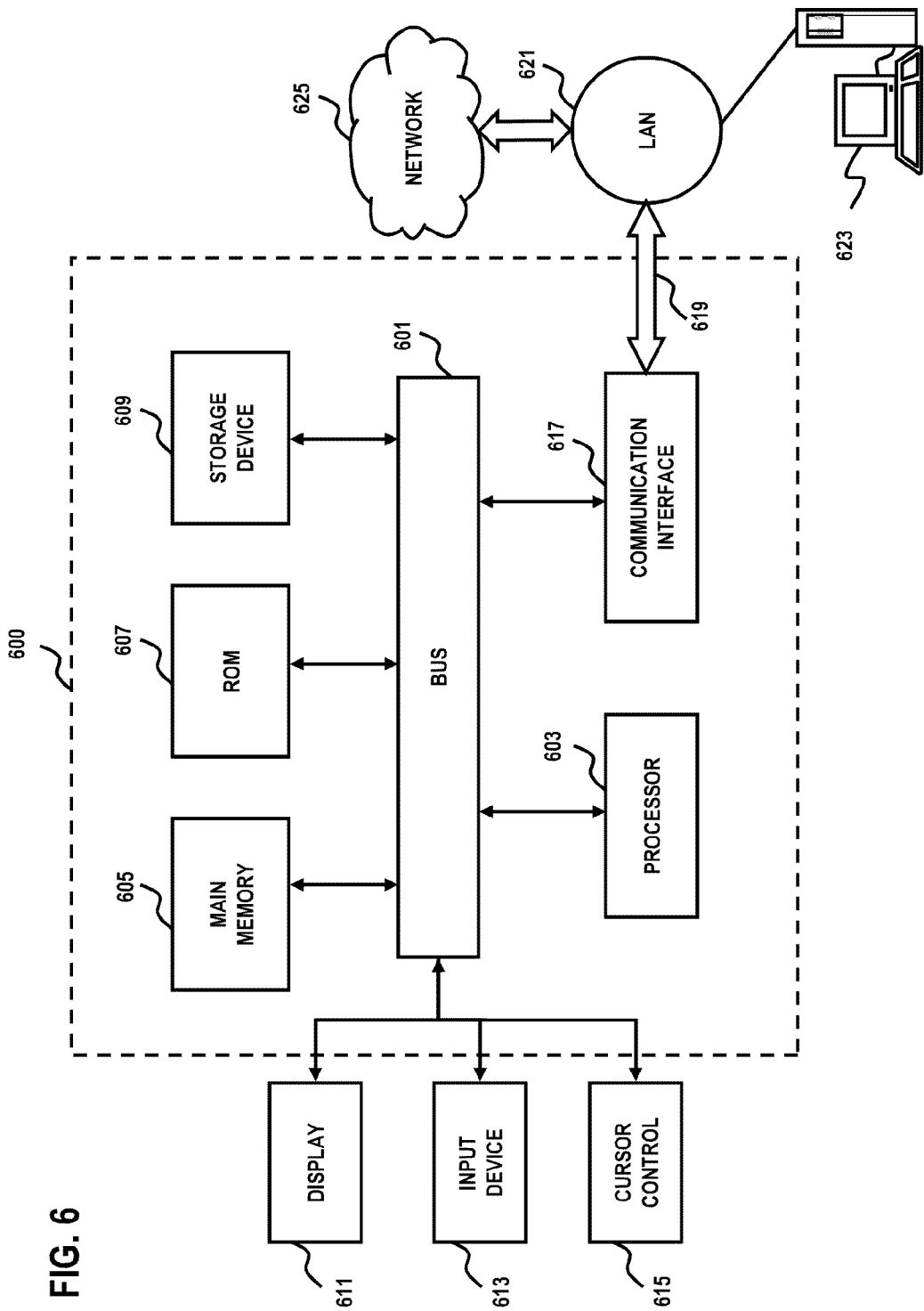
FIG. 6 is a diagram of a computer system that can be used to implement various exemplary embodiments.

FIG. 6 illustrates computing hardware (e.g., computer system) upon which an embodiment according to the invention can be implemented. The computer system 600 includes a bus 601 or other communication mechanism for communicating information and a processor 603 coupled to the bus 601 for processing information. The computer system 600 also includes main memory 605, such as random access memory (RAM) or other dynamic storage device, coupled to the bus 601 for storing information and instructions to be executed by the processor 603. Main memory 605 also can be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

The processes described herein for providing interactive automated testing and deployment/field troubleshooting may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multiprocessing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network channel 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless channels can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 4, multiple communication interfaces can also be employed.

The network channel 619 typically provides data communication through one or more networks to other data devices. For example, the network channel 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network channel 619 and through the communication interface 617, which communicate digital data with the computer system 600, are exemplary forms of carrier waves bearing the information and instructions.

The computer system 600 can send messages and receive data, including program code, through the network(s), the network channel 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set 700 upon which an embodiment of the invention may be implemented. Chip set 700 is programmed to perform subscriber migration as described herein and includes, for instance, the processor and memory components described with respect to FIG. 4 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of FIG. 2.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope and various obvious modifications and equivalent arrangements.

What is claimed is:

1. A method comprising:
determining a fault in a wireline voice network associated with a subscriber premise;
determining that the subscriber premise is associated with a chronic account based on the fault;
receiving an order to migrate the subscriber premise from the wireline voice network to a wireless voice network;
migrating the subscriber premise from the wireline voice network to the wireless voice network;
provisioning a wireless port with a dummy equipment identifier;
generating a work order to install a wireless voice device at the subscriber premise;
receiving an activation signal including an actual equipment identifier from the wireless voice device;
updating the wireless port to replace the dummy equipment identifier with the actual equipment identifier; and
updating the new subscriber record in a voice service database with a civic address of the subscriber premise.

2. A method according to claim 1, further comprising:
querying a wireline voice service database for a subscriber record associated with the subscriber premise; and
determining that the fault causes a number of faults associated with the subscriber record to satisfy a threshold, wherein the subscriber premise is associated with the chronic account if the threshold is satisfied.

3. A method according to claim 1, further comprising:
performing a line quality test on the wireline voice network associated with the subscriber premise,
wherein the determination of the fault is based on the line quality test.

4. A method according to claim 1, further comprising:
determining a location of the subscriber premise; and
determining that the location is within an affected area of the wireline voice network,
wherein the determination of the fault is based on the affected area.

5. A method according to claim 1, further comprising:
updating a subscriber record in an emergency services database via a network interface coupling the wireline voice network and an emergency services vendor,
wherein the subscriber record is updated to include a telephone number associated with the wireless voice interface and the civic address associated with the subscriber premise.

6. A method comprising:
determining a fault in a wireline voice network associated with a subscriber premise;
determining that the subscriber premise is associated with a chronic account based on the fault;
migrating the subscriber premise from the wireline voice network to a wireless voice network;
receiving a request to deactivate a wireline voice service associated with the subscriber premise;
disassociating the chronic account from a first billing system for the wireline voice network;
transferring a balance associated with the chronic account to a second billing system for the wireless voice network;
receiving usage data based on a usage of the wireless voice network; and
generating a bill based on the usage data and the transferred balance,
wherein the bill includes one or more adjustments associated with the migration from the wireline voice network to the wireless voice network.

7. A method comprising:
determining a fault in a wireline voice network associated with a subscriber premise;
determining that the subscriber premise is associated with a chronic account based on the fault;
migrating the subscriber premise from the wireline voice network to a wireless voice network;
detecting a wireless voice device at the subscriber premise;
determining a charge of a battery of the wireless voice device; and
indicating a need to change the battery based on the charge.

8. A method according to claim 7, wherein the need to change the battery is indicated via an electronic mail (email) message, a short message service (SMS) message, an indicator on the wireless voice device, or some combination thereof.

9. A method comprising:
determining a fault in a wireline voice network associated with a subscriber premise;
determining that the subscriber premise is associated with a chronic account based on the fault;
migrating the subscriber premise from the wireline voice network to a wireless voice network;
receiving an order to migrate the subscriber premise to the wireline voice network;

generating an order preview electronic mail (email) message based on an estimated cost for the migration,
wherein the order preview email is generated from 2 seconds to 5 seconds after the order is received.

10. A method comprising:
determining a fault in a wireline voice network associated with a subscriber premise;
determining that the subscriber premise is associated with a chronic account based on the fault;
migrating the subscriber premise from the wireline voice network to a wireless voice network;
provisioning the migration to the wireless voice network, the migration being based on one of a plurality of service levels;
obtaining bandwidth for the wireless voice network from a service provider of the wireless voice network; and
apportioning the bandwidth among the plurality of service levels,
wherein the migration to the wireless voice network is provisioned based on an assignment to one of the plurality of service levels.

11. An apparatus comprising:
at least one processor; and
at least one memory including computer program code for one or more programs,
the at least one memory and the computer program code configured to, with the at least one processor, cause the apparatus to perform at least the following,
determine a fault in a wireline voice network associated with a subscriber premise;
determine that the subscriber premise is associated with a chronic account based on the fault;
receive an order to migrate the subscriber premise from the wireline voice network to the wireless voice network;
migrate the subscriber premise from the wireline voice network to a wireless voice network;
provision a wireless port with a dummy equipment identifier;
generate a work order to install a wireless voice device at the subscriber premise;
receive an activation signal including an actual equipment identifier from the wireless voice device;
update the wireless port to replace the dummy equipment identifier with the actual equipment identifier; and
update the new subscriber record in a voice service database with a civic address of the subscriber premise.

12. An apparatus according to claim 11, wherein the apparatus is further caused to:
query a wireline voice service database for a subscriber record associated with the subscriber premise; and
determine that the fault causes a number of faults associated with the subscriber record to satisfy a threshold,
wherein the subscriber premise is associated with the chronic account if the threshold is satisfied.

13. An apparatus according to claim 11, wherein the apparatus is further caused to:
perform a line quality test on the wireline voice network associated with the subscriber premise,
wherein the determination of the fault is based on the line quality test.

14. An apparatus according to claim 11, wherein the apparatus is further caused to:
determine a location of the subscriber premise; and
determine that the location is within an affected area of the wireline voice network,
wherein the determination of the fault is based on the affected area.

15. An apparatus according to claim 11, wherein the apparatus is further caused to:
update a subscriber record in an emergency services database via a network interface coupling the wireline voice network and an emergency services vendor,
wherein the subscriber record is updated to include a telephone number associated with the wireless voice interface and the civic address associated with the subscriber premise.

16. An apparatus comprising:
at least one processor; and
at least one memory including computer program code for one or more programs,
the at least one memory and the computer program code configured to, with the at least one processor, cause the apparatus to perform at least the following,
determine a fault in a wireline voice network associated with a subscriber premise;
determine that the subscriber premise is associated with a chronic account based on the fault;
migrate the subscriber premise from the wireline voice network to a wireless voice network;
receive a request to deactivate a wireline voice service associated with the subscriber premise;
disassociate the chronic account from a first billing system for the wireline voice network;
transfer a balance associated with the chronic account to a second billing system for the wireless voice network;
receive usage data based on a usage of the wireless voice network; and
generate a bill based on the usage data and the transferred balance,
wherein the bill includes one or more adjustments associated with the migration from the wireline voice network to the wireless voice network.

17. An apparatus comprising:
at least one processor; and
at least one memory including computer program code for one or more programs,
the at least one memory and the computer program code configured to, with the at least one processor, cause the apparatus to perform at least the following,
determine a fault in a wireline voice network associated with a subscriber premise;
determine that the subscriber premise is associated with a chronic account based on the fault;
migrate the subscriber premise from the wireline voice network to a wireless voice network;
detect a wireless voice device at the subscriber premise;
determine a charge of a battery of the wireless voice device; and
indicate a need to change the battery based on the charge.

18. An apparatus according to claim 17, wherein the need to change the battery is indicated via an electronic mail (email) message, a short message service (SMS) message, an indicator on the wireless voice device, or some combination thereof.

19. An apparatus comprising:
at least one processor; and
at least one memory including computer program code for one or more programs,
the at least one memory and the computer program code configured to, with the at least one processor, cause the apparatus to perform at least the following,
determine a fault in a wireline voice network associated with a subscriber premise;

determine that the subscriber premise is associated with a chronic account based on the fault;
migrate the subscriber premise from the wireline voice network to a wireless voice network;
receive an order to migrate the subscriber premise to the wireline voice network; and
generate an order preview electronic mail (email) message based on an estimated cost for the migration,
wherein the order preview email is generated from 2 seconds to 5 seconds after the order is received.

20. An apparatus comprising:
at least one processor; and
at least one memory including computer program code for one or more programs,
the at least one memory and the computer program code configured to, with the at least one processor, cause the apparatus to perform at least the following,
determine a fault in a wireline voice network associated with a subscriber premise;
determine that the subscriber premise is associated with a chronic account based on the fault;
migrate the subscriber premise from the wireline voice network to a wireless voice network;
provision the migration to the wireless voice network, the migration being based on one of a plurality of service levels;
obtain bandwidth for the wireless voice network from a service provider of the wireless voice network; and
apportion the bandwidth among the plurality of service levels,
wherein the migration to the wireless voice network is provisioned based on an assignment to one of the plurality of service levels.

21. A system comprising:
a subscriber migration platform configured to determine a fault in a wireline voice network associated with a subscriber premise, determine that the subscriber premise is associated with a chronic account based on the fault, receive an order to migrate the subscriber premise from the wireline voice network to a wireless voice network; migrate the subscriber premise from the wireline voice network to a wireless voice network, provision a wireless port with a dummy equipment identifier; generate a work order to install a wireless voice device at the subscriber premise; receive an activation signal including an actual equipment identifier from the wireless voice device; update the wireless port to replace the dummy equipment identifier with the actual equipment identifier; and update the new subscriber record in a voice service database with a civic address of the subscriber premise.

* * * * *